United States Patent [19]
Mackrle et al.

[11] 3,815,750
[45] June 11, 1974

[54] ARRANGEMENT FOR CONTINUOUS TREATMENT OF POLLUTED LIQUIDS

[75] Inventors: Svatopluk Mackrle, Brno; Vladimir Mackrle, Praha, both of Czechoslovakia

[73] Assignee: Ceskoslovenska Akademic Ved, Praha, Czechoslovakia

[22] Filed: May 30, 1972

[21] Appl. No.: 257,589

Related U.S. Application Data

[62] Division of Ser. No. 94,668, Dec. 3, 1970, abandoned.

[30] Foreign Application Priority Data

Dec. 11, 1969 Czechoslovakia .................. 8151-69

[52] U.S. Cl.................. 210/202, 210/208, 210/221, 210/260, 210/261, 210/262, 210/294, 210/512, 210/523, 210/532
[51] Int. Cl............................................ B01d 21/26
[58] Field of Search............................. 210/3–8, 15, 210/20, 195, 196, 197, 221, 519, 523, 532, 512, 322, 252, 201, 202, 259, 260, 294, 261, 262, 208

[56] References Cited
UNITED STATES PATENTS

| | | | |
|---|---|---|---|
| 3,398,089 | 8/1968 | Mackrle et al.................. | 210/20 X |
| 3,472,764 | 10/1969 | Culp et al. .............................. | 210/7 |
| 3,524,810 | 8/1970 | Mackrle et al......................... | 210/20 |
| 3,627,136 | 12/1971 | Mackrle et al......................... | 210/519 X |

Primary Examiner—Samih N. Zaharna
Assistant Examiner—F. F. Calvetti
Attorney, Agent, or Firm—Murray Schaffer

[57] ABSTRACT

Polluted liquids are treated by a bioflocculation process and the thus obtained floccular suspecsion is separated by filtration in a perfectly floating sludge blanket, whereby prior to filtration, the suspension, created in the course of the bioflocculation process, is subjected to a sedimentation, whereby a first stream obtained by sedimentation containing a diluted suspension is passed to be filtered in the perfectly floating sludge blanket and a second stream containing a concentrated suspension is returned into the bioflocculation process.

5 Claims, 3 Drawing Figures

ARRANGEMENT FOR CONTINUOUS TREATMENT OF POLLUTED LIQUIDS

This is a division of Ser. No. 94,668 filed Dec. 3, 1970, which is now abandoned.

BACKGROUND OF THE INVENTION

The arrangement according to this invention relates to a continuous treatment of polluted liquids by bioflocculation, followed by separation of the created suspension by filtration in a sludge blanket.

The bioflocculation process represents a continuous microbiological process, where organic components of contamination are mineralized by the enzymatic action of microoganisms. The efficiency of microbiologic processes depends on the concentration of microorganisms and on the achievement of optimum conditions for their multiplication in the entire volume of liquid in the course of the clarification process. The suspension created by bioflocculation is removed in the subsequent clarification stage by a separating process, whereby the major part of the suspension must recirculate back into the bioflocculation space in order to increase the concentration of microorganisms and thus also of the speed of the clarification process.

Several systems for biological clarification of water both for large and small capacity are known. They differ in the applied separation method, in the recirculation system of the suspension and in the specific structural arrangement. For large output a simple sedimentation is generally used for separation. Recently also filtration through a not perfectly floating sludge blanket has been attempted. There is also a solution for separation of the suspension using a perfectly floating sludge blanket. Arrangements with small output use suspension sedimentation and recently also filtration in a not perfectly floating sludge blanket.

Under the broad term "filtration in a perfectly floating sludge blanket" there is meant a separating system where filtration proceeds in a space containing a sludge blanket, where the suspension is perfectly fluidized, that is, where its sedimentation is prevented and the excess suspension retained by filtration is discharged from the level of the floccular sludge blanket into a separated concentrating space, where it sediments and is concentrated. Under "filtration in a not perfectly floating sludge blanket" a separation system is meant, where the suspension retained by filtration sediments in the space of the sludge blanket and is discharged from its bottom.

The circulation system of the suspension differs at actual arrangements according to the used separation process. In arrangements using separation by sedimentation or by filtration in a perfectly floating sludge blanket, the recirculation of the required amount of suspension is achieved by pumping the sediment and concentrated sludge from the separated sedimentation space to the bioflocculation space. In arrangements, where separation in a perfectly floating sludge blanket is used, no pumping is required, as the suspension sediments directly from the space of the sludge blanket back into the bioflocculation space.

Regarding construction, actually known arrangements for biological clarification of water can be divided to two groups: firstly an arrangement, where the separating process is separated from the bioflocculation process in an independent vessel and secondly an arrangement where both these processes proceed in the same vessel. Separated separation spaces are used for sole sedimentation in flat rectangular or circular sedimentation tanks. The combination of bioflocculation and separating processes is common for arrangements using for separation filtration in a sludge blanket. Known arrangements of this type use rectangular tanks or flat circular tanks with a vertical axis, where inserted separating walls create two separate spaces for bioflocculation and separation.

All actually known solutions of arrangements for biological clarification of water have a number of drawbacks. Arrangements using as the separation process sole sedimentation or known arrangements using a perfectly floating sludge blanket, have the main drawback, that the suspension required for recirculation has first to settle and concentrate in a separated sedimentation space, wherefrom it is pumped back into the bioflocculation space. Thus the fundamental requirement for maintenance of a constant concentration and of optimum conditions for multiplication of microorganisms in the whole space of the treated liquid and in the course of the whole clarification process is violated. The microorganisms, which adapt themselves to a lack of oxygen and of nutritious substances in the sedimentation space, have to be reactivated after recirculation, increasing thus requirements for size of the bioflocculation space. A further drawback of these arrangements is, that the separation process is burdened also by the recirculating suspension, thus again increasing requirements on size and surface of separating spaces, particularly of the sedimentation space.

A drawback of filtration by a not perfectly floating sludge blanket is the low specific output, which is in comparison with the perfectly floating sludge blanket approximately one half and requires therefore twice the surface of the separating space.

All actually known arrangements have unsuitable shapes, both from the point of view of construction and of hydraulics. The main drawbacks of construction are the need to always add to the bioflocculation space a separation space as an independent structural unit and that this separation space and bioflocculation space have to be always side by side. The necessity to provide a structurally independent space complicates the construction of the arrangement and a horizontal alignement of these two operating spaces side by side substantially increases requirements for floor space.

Rectangular vessels are in addition statically not advantageous and flat cylindrical vessels with a vertical axis are not advantageous for creating compact units by joining the bioflocculation and separation space to a simple unit and substantially increase requirement for floor space, if they are aligned to batteries side by side. The size of similar arrangements, with the exception of smaller units of the output within the range of liters per second, require an assembling on the site, in most cases as reinforced concrete constructions with complicated foundations on a base plate. These shapes are also not advantageous from the point of view of hydraulics. Dead corners prevent, in rectangular vessels, the full utilization of the space. In flat vertical circular vessels, the hydraulic distribution system does not allow the construction of large units with an optimum utilization of space. All these drawbacks show in high investment costs and high requirements on floor surface and on enclosed space.

Another common drawback of all actually known arangements is their low efficiency in removal of phosphates and nitrates. Organical compounds of nitrogen are mineralized by the enzymatic action to nitrates and organical compounds of phosphorus are mineralized to phosphates which, dissolved in water, return to the water sources. The nitrates and phosphates promote the creation of water plankton and their accumulation causes a rampant growth of plant micro- and macroorganisms, particularly of algae. The result thereof is a disturbance of the ecologic equilibrium of surface water sources, promoting a secondary pollution due to decomposition of an enormous amount of algae, grown in the course of the vegetation season. In order to eliminate this drawbacks of biological clarification, an additional chemical clarification must be provided in order to remove at least one of these components, for instance by chemcial coagulation of phosphates by coagulation agents with iron components. Actually known arrangements for biological clarification require for the additional chemical clarification of biolgiclally clarified water either additional devices, which are rather expensive, or the coagulation agent with iron components has to be added prior to starting the separating process in arrangements for biological cleaning; this brings for arrangements with known recirculation systems the drawback, that an inert suspension, generated chemically, returns into the bioflocculation space, cumulates in this space and burdens unproductively all operating processes, causing a necessary increase of all operating spaces of the arrangement.

SUMMARY OF THE INVENTION

It is an object of this invention to provide an arrangememt for continuous treatment of liquids by bioflocculation with subsequent separation of the created floccular suspension where a part of the suspension is automatically returned into the space where the bioflocculation process proceeds, without taking part on the filtration by the sludge blanket. Preferably the separation is accomplished by filtration in a sludge blanket.

It is another object of this invention to permit the combination of the above arrangement with means for chemical coagulation and removal of organical compounds such as for instance phosphates without additionally burdening the bioflocculation process.

It is still another object of this invention to permit the use in the filtration process of the highly efficient perfectly floating sludge blanket.

Bearing these and other objects in mind, according to the present invention the suspension, created in the course of the bioflocculation process is subjected prior to separation of the floccular suspension preferably in a perfectly floating sludge blanket, to a sedimentation process, whereby after this sedimentation a first stream of diluted suspension proceeds to be filtered in the separation process and a second stream of concentrated suspension returns due to gravitation back into the space where the bioflocculation process proceeds.

DESCRIPTION OF DRAWINGS

Exemplary embodiments of arrangements operating according to this invention are schematically shown in the accompanying drawings, where.

DESCRIPTION OF PREFERRED EMBODIMENTS

Figure 1:
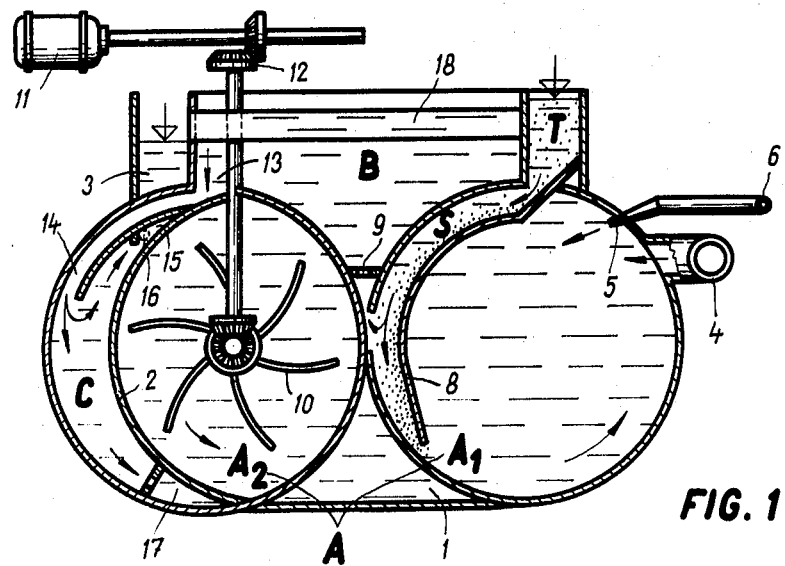
FIG. 1 is a cross sectional view of one embodiment, FIG. 2 the corresponding top view and FIG. 3 a cross sectional view of an alternative embodiment, including an additional device for chemical cleaning.
Figure 2:
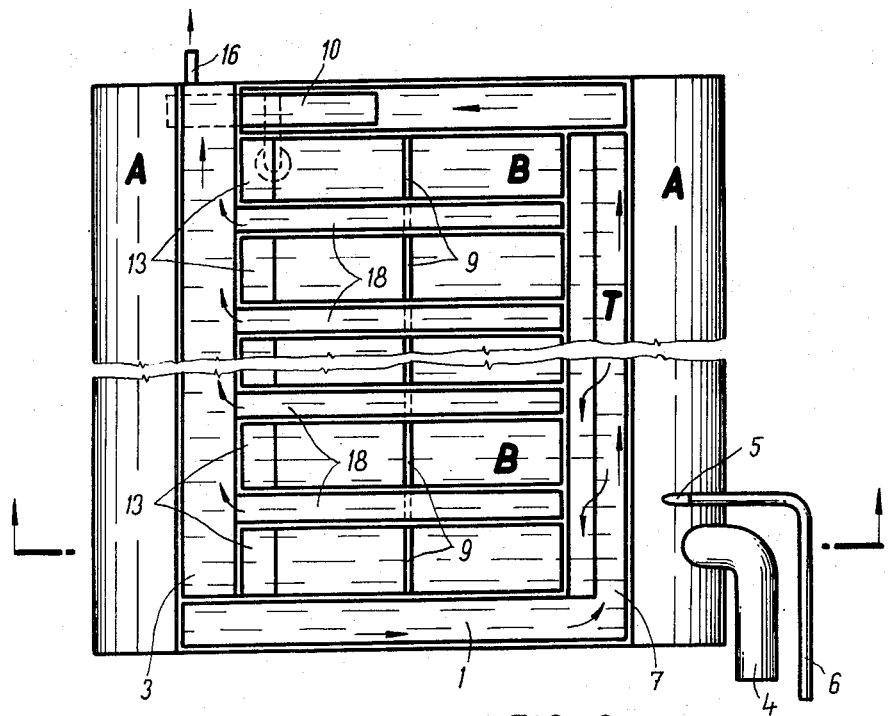

The arrangement shown in FIGS. 1 and 2 is designed for biological treatment of liquids, particularly for clarification of waste water. The arrangement comprises a bioflocculation space A, composed of two independent parts $A_1$ and $A_2$, enclosed in tanks with mantles of substantially cylindrical shape with a horizontal axis, which tanks are aligned longitudinally side by side. The separate parts $A_1$ and $A_2$ of the bioflocculation space A are mutually interconnected on both ends by connecting means 1. A sedimentation space C is separated by a partition wall 2 from part $A_2$ of the bioflocculation space A. On top of the cylindrical mantle, enclosing part $A_1$ of the bioflocculation space A is a distribution trough T and on the mantle of part $A_2$ a collecting channel 3, which simultaneously from the lateral walls of an open space B with the sludge blanket. The bottom of the sludge blanket space B is formed by parts of the mantles of both independent parts $A_1$ and $A_2$ of the bioflocculation space A and the front walls of this space are walls of the connecting means 1. Part $A_1$ bioflocculation the bicflocculation space A is provided with supply means 4 of raw water and with supply means 6 of an oxydation gas, terminating in a tube passing over into a jet 5. In the jet 5 the oxydation gas is dispersed by pressure water. The distribution trough T is connected with the end of bioflocculation space $A_1$ over the opening 7. The distributing trough T terminates in its lower part into the sedimentation channel S, formed by a part of the cylindrical mantle, enclosing the bioflocculation space $A_1$ and by a partition wall 8, which is equally substantially cylindrical and coaxial with said mantle and extending within the whole length of the bioflocculation space $A_1$. The partition wall 8 creates with the mantle on its lower extremity a gap, by means of which this channel terminates into the bioflocculation space $A_1$. The sedimentation channel S is also connected with the space B with the sludge blanket over diffusion openings 9, the cross section of which is determined so that the speed of the throughgoing liquid secures a perfect fluidization of the sludge blanket in space B, so that any sedimentation in this space is prevented.

Part $A_2$ of the bioflocculation space A is provided with a mechanical agitator 10 of a transverse circulation, (i.e. producing circulation about the longitudinal axis as seen by the arrow) driven by an electric motor 11 over a gear case 12. The motor 11 and gear case 12 may drive a number of mechanical agitators 10 for this purpose, if the arrangement is composed of a number of described units, aligned side by side as if in a battery. The partition wall 2 separates from part $A_2$ of the bioflocculation space a sedimentation space C, connected with space B of the sludge blanket by overflow ports 13. The sedimentation space C is provided in its upper part with a rectifying wall 14 separating a collecting space 15 of sedimented water along the whole length of the sedimentation space C from the overflow ports 13. The collecting space 15 is connected by the conduit 16 with the collecting channel 3 of clarified water. The lower part of the sedimentation space C is provided along the whole length with a sludge removal conduit 17. A system of collecting troughs 18, which convey the clarified water to the collecting channel 3 is provided in the upper part of space B with the sludge blanket, the conduit 16 terminating equally into said collecting channel 3.

The described arrangements operates as follows:

The waste water with added coagulation agents and possibly also with nutritious substances for microorganisms enters via the supply means 4 of raw water into the bioflocculation space A and its stream is directed tangentially in order to promote a rotating motion in the bioflocculation space A. The oxydizing gas supplied via the supply means 6 is dispersed over the jet 5 by pressurized water. The closed form of the bioflocculation space A enables an effective utilization of the injected oxydizing gas due to its high grade dispersion, which causes a uniform distribution of the oxydizing gas within the whole space of both parts $A_1$ and $A_2$ of the bioflocculation space A. Due to the uniform distribution of oxydizing gas no transverse circulation is generated in the bioflocculation space by the so called mammoth or air lift effect and a sufficient transverse circulation has to be obtained by a mechanical agitator 10, which circulation is propagated along a helical line in a closed circuit in both parts $A_1$ and $A_2$ of the bioflocculation space. The connecting means 1 on both ends of the bioflocculation space A composed of both parts $A_1$ and $A_2$ are designed so as to enable the propagation of this helicoidal motion from one part of the bioflocculation space A to the other one. A part of the treated water circulating in both parts of the bioflocculation space A enters continually via the opening 7 into the distributing trough T. The water with the suspension created by bioflocculation is distributed by the distributing trough T into the sedimentation channel S along its whole length. The sedimentation channel S is distinctly inclined with respect to a vertical line. The suspension sediments in the sedimentation channel S due to gravitation and concentrates along the partition wall 8, whereas water with diluted suspension collecting along the wall of the mantle enters via the diffusion openings 9 into the space B with the sludge blanket, where it is retained by filtering in the perfectly floating sludge blanket. The clarified water on top of the sludge blanket is collected by the system of collecting troughs 18 situated in the upper part of the space B with the sludge blanket, which collecting troughs 18 convey the water to the collecting channel 3. The suspension retained by filtering in the sludge blanket is sucked on from the surface of the sludge blanket via the overflow ports 13 into the sedimentation space C. The rectifying wall 14 rectifies the incoming stream into the lower part of the sedimentation space C, where the suspension sediments, is concentrated and periodically discharged over the sludge removal conduit 17. The supernatant water from the upper part of the sedimentation space C is collected in the collecting space 15 and conveyed via the conduit 16 to the collecting channel 3. The suspension concentrated by gravitation in the sedimentation channel S returns to part $A_1$ of the bioflocculation space A and is taken along by the transverse circulating motion in this space. Thus one part of the suspension entering, the sedimentation channel S is returned into the bioflocculation process without taking part in the separating process in the sludge blanket. This enables the application of a perfectly floating sludge blanket in case a higher concentration has to be maintained in the bioflocculation space than would correspond to the amount of suspension created by bioflocculation. The concentration of suspension in the bioflocculation space is aerobically stabilized on a constant value as the efficiency of separation in the separating channel S due to gravitation depends on the concentration of the suspension entering said channel. If therefore in the course of operation of the arrangement the concentration in the bioflocculation space A increases, the concentration of suspension supplied to the sedimentation channel S equally increased, reducing thus the efficiency of sedimentation and consequently also the efficiency of separation. This automatic adjustment determines a state of equilibrium of the concentration in the bioflocculation space A. The concentration of suspension at this state of equilibrium depends therefore practically only on the dimensions and on the geometric configuration of the sedimentation channel S.

The described arrangement for cleaning of waste waters can be advantageously operated with pure oxygen as oxydation gas. In this case the closed shape of the bioflocculation space A reduces losses of oxygen and substantially contributes to an economical utilization of oxygen, as the amount of oxygen does not surpass the amount, required for biological processes.

Figure 3:
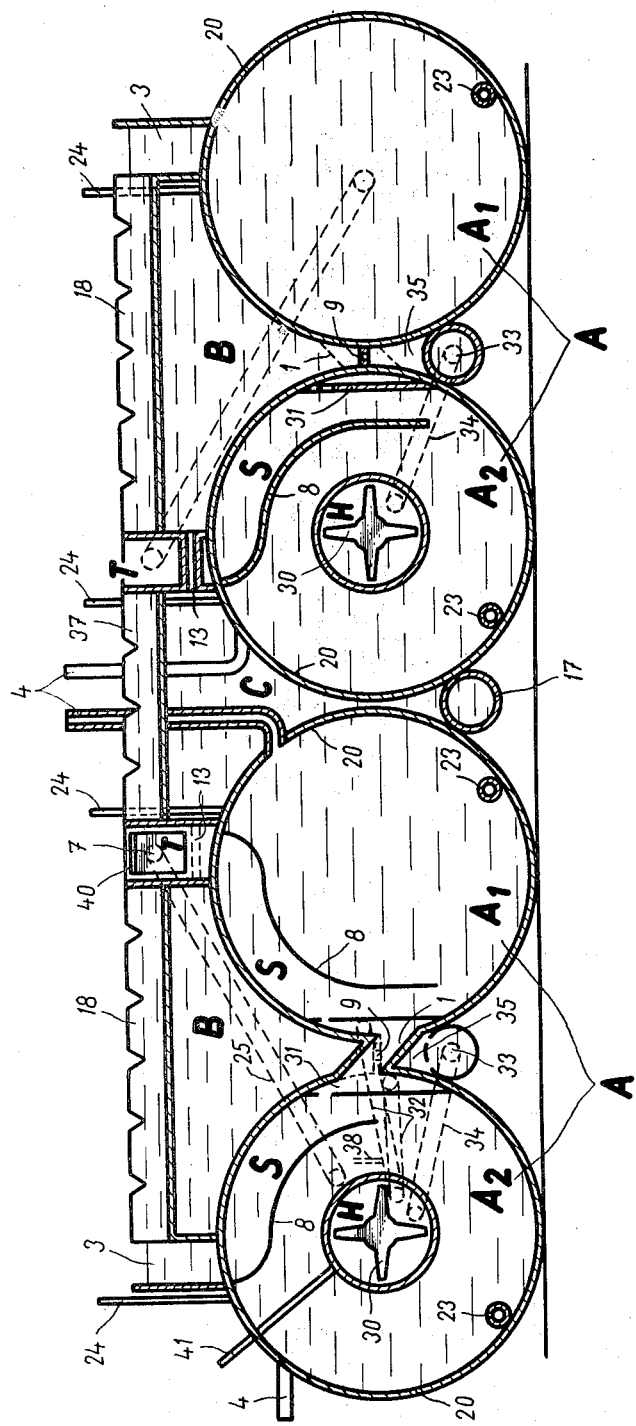

The arrangement shown in cross section in FIG. 3 represents a modification of the exemplary arrangement of FIGS. 1 and 2. This arrangement can be advantageously used for cleaning of organically polluted water, particularly where it is necessary to eliminate from the water phosphates in order to prevent secondary pollution of surface water courses due to rampant growth of algae. The arrangement consists of two fundamental operating units aligned horizontally and longitudinally side by side to a battery. The left part of FIG. 3 represents a cross section of one of the operating units on one end of the arrangement and the right part of FIG. 3 a cross section of the second operating unit on the opposite end of the arrangement. In FIG. 3 the same reference numbers have been used for designation of corresponding operating and constructional elements as in the previous case, shown in FIGS. 1 and 2. The main difference from the first exemplary embodiment is that an arrangement for additional cleaning of water for removal of phosphates by sedimentation using coagulation by coagulation agents comprising iron compounds is included into the arrangement for biological cleaning of water. It differs furthermore in that the sedimentation space C is not located inside the bioflocculation space A but above this space, whereby the bottom of the sedimentation space C is formed by parts of mantles 20 of the bioflocculation spaces A of both operating units.

The arrangement consists of two fundamental operating units aligned horizontally and longitudinally side by side to a battery. Each operating unit is composed of two parts $A_1$ and $A_2$ of the bioflocculation space A, enclosed in cylindrical mantles 20; which are aligned horizontally and longitudinally side by side and form by parts of their mantles the bottom of the space with the sludge blanket. Each part $A_1$ and $A_2$ of the bioflocculation space A is provided with a number of supply means 4 of raw water, distributed uniformly along their whole length and which terminate tangentially in direction of circulation of water with added coagulation agents and possibly also with nutritious substances for the microorganisms in both parts $A_1$ and $A_2$ of the bioflocculation space A, which circulation is caused by the mammoth or air lift effect due to aeration by means of the device 23 for supply of air. Both parts $A_1$ and $A_2$ of the bioflocculation space A are provided with deaerating tubes 24 provided at the top of said spaces. Parts $A_1$ and $A_2$ of each operating unit are mutually interconnected on both ends by connecting means 1. Both parts $A_1$ and $A_2$ are furthermore connected at both ends by a connecting conduit 25, by an opening 7, of the distributing trough T, provided with an adjusting gate 40, by the distribution trough T and by the sedimentation channel S. The sedimentation channel S is determined by a part of the mantle 20 and by a partition wall 8 and terminates in the lower part of spaces $A_1$ and $A_2$ in direction of circulation of water in said spaces. The distribution trough T is situated on top of the mantle 20 of each part $A_1$ and $A_2$ of the bioflocculation space A and extends together with the sedimentation channel S always for one half of the length of each part $A_1$ and $A_2$ on the end of interconnecting by the connecting conduit 25, connecting the connecting trough T with the respective parts of the bioflocculation space A. A collecting channel 31 is situated on the external wall of the sedimentation channel S along its whole length, approximately in its half. The collecting channel 31 is connected via a connecting conduit 32 into which the supply 38 of the coagulation agent is terminating, with one end of the homogenizer H. The homegenizer H is of a cylindrical shape and is situated coaxially inside the mantle of part $A_2$ of the bioflocculation space A along its whole length. The homogenizer is provided with a mechanical agitator 30 driven by a motor and with supply means 41 for the addition of a polycoagulation agent, or organic coagulation agent, terminating in the first third of the homogenizer H. The second end of the homogenizer H is connected via the connecting conduit 34 with the distribution channel 33, situated below the space B with the sludge blanket along its whole length in the free space between both mantles 20 so, that it determines with parts of said mantles 20 a dissipation space 35 in front of the entrances into the space B with the perfectly floating sludge blanket over diffusion openings 9, situated in the narrowest place between both mantles 20. The upper part of the space B with the sludge blanket is provided with collecting channel 18 terminating into collecting channels 3, situated equally on top of the mantles 20 on the second half of length of said mantles, at places where there are no distributing troughs T. By the alignement of two operating units horizontally and parallel side by side to a battery, a sedimentation space C is created, the bottom of which is formed by parts of mantles 20 of the bioflocculation space A of both operating units. At the level of the sludge blanket of each space B with the sludge blanket, overflow ports 13 are provided, connecting space B with space C. The sedimentation space C is provided in its lower part with a sludge removal conduit 17 and in its upper part with collecting troughs 37 of sedimented water, terminating into collecting channels 3.

The arrangement is therefore composed of two operating units, having a common sedimentation space C. The bioflocculation proceeds in each operating unit in the bioflocculation space A, consisting of two parts $A_1$ and $A_2$, where the water is aerated by introducing air over the device 23 for the supply of air. A transverse or rotary circulation of water is here promoted in both parts of the bioflocculation space A by the so called mammoth effect. The situation of the devide 23 for the supply of air in both parts $A_1$ and $A_2$ and the interconnecting means 1 of both said parts is chosen so that the water circulating transversally due to the mammoth effect can stream freely over the connecting means 1 from one part of the bioflocculation space A to the other one in a closed circuit. A helicoidal stream in both interconnected parts $A_1$ and $A_2$ around the axis of the mantles 20 enclosing said spaces in thus achieved.

The raw water, divided to equal parts, enters tangentially both parts $A_1$ and $A_2$ of the bioflocculation space A on a number of places so that the distance of supply means 4 of raw water is less than 10 meters. Thus a more uniform supply of nutritious substances for the biological processes is achieved and consequently their efficiency increased. The excess air is removed from the bioflocculation space A over deaerating tubes 24. A part of the water containing the suspension created by bioflocculation is collected over the connecting conduit 25, the opening 7 with the adjusting gate 40 in the distributing trough T, which distributes the water into the upper part of the sedimentation channel S. The suspension concentrates on the internal wall of the sedimentation channel S, formed by the partition wall 8 and falls therefrom into the bioflocculation space A in direction of circulation in this space. The water with the diluted suspension is collected from the sedimentation channel S along its whole length over the collecting channel 31 and passes over the connecting conduit 32 into the homogenizer H. Prior to entrance into the homogenizer H, a coagulation agent for coagulation of phosphates is introduced into the water. The flocs created by coagulation are homogenized by turbulence, promoted by the mechanical agitator 30 driven by the motor 36. During periods of worse coagulation a polycoagulation agent is supplied over supply means 41 into the first third of the homogenizer. After the water with the homogenized suspension has passed through the homogenizer H, it is conveyed via the connecting conduit 34 to the distributing channel 33, which distributes the water uniformly over distributing openings into the dissipation space 35, where the energy of the water, gained in the distributing openings is dissipated prior to entrance into space B with the sludge blanket. The diffusion openings 9 at the entrance of space B with the sludge blanket are chosen according to conditions required for filtration in a perfectly floating sludge blanket. The excess suspension is removed from the surface of the sludge blanket via overflow ports 13 into the sedimentation space C, where it sediments, concentrates and is periodically drained over the sludge removal conduit 17. The water cleared by the perfectly floating sludge blanket is removed from the upper part of space B over collecting troughs 18 to collecting channels 3, where also supernatant water from the upper part of the sedimentation space C, collected in collecting troughs 37 of sedimented water, is introduced.

The coagulation agent added to the treated liquid will differ according to the kind of liquid and to the pollution. For treatment of water lime is generally suitable. Polycoagulation agents are generally of the organic or polyacrylate type.

The method and arrangement according to this invention offer a number of advantages. The application of a recirculation system, using a sedimentation channel for returning the suspension back into the bioflocculation process without passing though the separation process, permits the maintenance of the suspension always in a condition for optimum multiplication of microrganisms. The result thereof is an intensification of the cleaning processes by bioflocculation and a substantial reduction of burdening of the separation process. This results in a reduction of the specific volume of the arrangement and in a reduction of consumption of energy for a unit amount of cleaned liquid.

Another great advantage of the arrangement according to this invention is the possibility of application of an additional chemical cleaning process for removal of phosphates by coagulation by coagulation agents containing iron compounds, without any recirculation of the chemically created suspension back into the bioflocculation space. Thus the burdening of the bioflocculation process with an inert mass, which does not take part in the biological process, is eliminated.

The main structural advantage is that the whole arrangement can be composed of simple elements, which are of suitable size, which are statically determinated, which can be manufactured in manufacturing plants, and transported finished to the required site and that by a simple alignement of a number of units side by side, a cleaning station of any output can be built. As there is no need, to build independent spaces with a sludge blanket, the whole construction of the arrangement can be reduced to the geometrically simplest shapes, for instance to simple cylindrical vessels. As the space with the sludge blanket is above the bioflocculation spaces, the mantles of which form a bottom of the sludge blanket space of suitable shape, substantial savings of floor space are obtained, whereby the simple construction represents a substantial simplification of building of cleaning stations.

An advantage of the longitudinal conception of the arrangement is, that the output can be adjusted by a mere change of the length of the arrangement without changing the transverse dimensions and by alignement of operating units side by side to a battery. That enables to cover with a minimum amount of moduls of constructional elements a large number of arrangements of different output from units for liters per second to a number of thousands of litres per second. This circumstance enables a typisation of water cleaning stations and the manufacture of constructional elements in large series. The cylindrical shapes of the bioflocculation space have in addition to constructional advantages also hydraulic advantages. The cylindrical shape enables a maximum utilization of the operating spaces and the achievement of a transverse and longitudinal circulation with a minimum energy consumption. Another advantage of cylindrical vessels is the possibility of being closed, separated from the ambient atmosphere, enabling an economical use of pure oxygen as oxydation gas. The closed shapes of the bioflocculation space prevent any escapement of oxygen and reduce its need practically to the amount required for bioflocculation processes. In case of a cheap source of oxygen, it is possible to reduce in arrangements according to this invention operating costs, as operation with oxygen substantially reduces the energy consumption for a unit of volume of the cleaned liquid in comparison to aeration, requiring a larger energy consumption.

All these advantages show in a substantial reduction of required floor space amounting up to 50 percent and in a reduction of the specific volume of the arrangement for one unit of cleaned liquid up to one third. This circumstance, together with a substantial simplification of the construction and method of building foundations, the prefabrication of operating elements manufactured in large series, the possibility of transport of finished constructional elements to the site of erection of the station and the easy assembling, are sources of substantial savings of investment costs. The perfect utilization of operating spaces and the increased efficiency of the cleaning processes enable also a reduction of operating costs.

The possibility of a simple and not costly arrangement for additional chemical cleaning for removal of compounds of phosphorus from the biologically cleaned water increases substantially the possibilities of the cleaning system and solves the elimination of one of major sources of secondary pollution of surface waters, particularly of lakes and fiords.

We claim:

1. An arrangement for the continuous treatment of polluted liquids by a bioflocculation process comprising a bioflocculation space and a chamber having a perfectly fluidized sludge blanket situated above said bioflocculation space, said bioflocculation space enclosed in at least two connected vessels of substantially cylindrical shape having outer mantles with a horizontal axis, aligned side by side, the bottom of the chamber having the perfectly fluidized sludge blanket being formed at least partly by the mantles of the bioflocculation vessels, means for supplying a polluted liquid to be treated into one of said vessels forming said bioflocculation space, means for supplying oxydation gas into said bioflocculation space, means for promoting a helical and circulating motion in the vessels forming the bioflocculation space, said polluted liquid being converted in said bioflocculation space to a suspension, a sedimentation channel inclined with respect to a vertical line and provided adjacent the bioflocculation space, means connecting the second of said vessels forming said bioflocculation space and said sedimentation channel for delivering a portion of said suspension to said sedimention channel, said sedimentation channel having a cross section allowing a partial sedimentation of the suspension at its bottom in the course of passage of the suspension through said sedimentation channel, said sedimentation channel being provided with first outlet openings terminating into the chamber having the perfectly fluidized sludge blanket for passage of the remaining suspension therethrough and second outlet openings, returning the concentrated suspension into said bioflocculation space, both said outlet openings being in the lower part of the sedimentation channel.

2. The arrangement as set forth in claim 1 wherein said two vessels enclosing the bioflocculation space are mutually interconnected by first connecting means at both ends, said first connecting means capable of transmitting the helical and circulating motion in both vessels, and wherein the means for connecting said second vessel and said sedimentation channel includes a distribution trough, said trough being situated above the respective mantle of said second vessel, said sedimentation channel terminating in the other vessel of the bioflocculation space.

3. The arrangement as claimed in claim 1, wherein the bioflocculation spaces are closed spaces and at least some of them being provided with mechanical agitators, promoting a transverse circulation.

4. An arrangement for the continuous treatment of polluted liquids by a bioflocculation process comprising a bioflocculation space and a chamber having a perfectly fluidized sludge blanket situated above said bioflocculation space, said bioflocculation space enclosed in at least two connected vessels of substantially cylindrical shape having outer mantles with a horizontal axis, aligned side-by-side, the bottom of said chamber with the fluidized sludge blanket being formed at least partly by the upper parts of the adjacent mantles of the bioflocculation space, means for supplying a polluted liquid to be treated into one of said vessels forming said bioflocculation space, means for supplying oxydation gas into said bioflocculation space, means for promoting a helical and circulating motion in the vessels forming the bioflocculation space, said polluted liquid being converted in said bioflocculation space into a suspension, a sedimentation channel sharply inclined with respect to a vertical line provided adjacent to the bioflocculation space, said sedimentation channel having an inlet opening at the top to receive the suspension after passage through the second vessel forming said bioflocculation space and adapted to separate said suspension into a supernatant liquid and a concentrated suspension, a homogenizer situated concentrically within at least one vessel forming the bioflocculation space for forming a homogenized liquid from said suspension, mechanical agitator means in said homogenizer, means for supplying at least one coagulation agent into said homogenizer, first collecting means in the lower part of said sedimentation channel for collecting the supernatant liquid, said first collecting means being connected to one end of said homogenizer, second collecting means in the lower part of the sedimentation channel for collecting the concentrated suspension and returning the concentrated suspension into the bioflocculation space, outlet means at the second end of said homogenizer, conduit means connected to said outlet means terminating in a space below the space defining the perfectly floating sludge blanket, said conduit extending along the entire length of said space defining the perfectly floating sludge blanket for passage of the homogenized liquid thereto, and for dissipating the kinetic energy of said homogenized liquid prior to entrance therein, and trough means for collecting the liquid above the perfectly floating sludge blanket after its passage therethrough.

5. The arrangement comprising a plurality of units each formed in accordance with claim 4, and each being mutually interconnected with each other at both ends and having a common trough.

* * * * *